United States Patent
Watanabe et al.

(10) Patent No.: US 9,071,185 B2
(45) Date of Patent: Jun. 30, 2015

(54) CONSTANT VOLTAGE CIRCUIT AND ANALOG ELECTRONIC CLOCK

(71) Applicant: Seiko Instruments Inc., Chiba-shi, Chiba (JP)

(72) Inventors: Kotaro Watanabe, Chiba (JP); Makoto Mitani, Chiba (JP)

(73) Assignee: SEIKO INSTRUMENTS INC., Chiba-Shi, Chiba ( * ) Notice: Subject to any disclaimer, the term of this patent is extended or adjusted under 35 U.S.C. 154(b) by 20 days.

(21) Appl. No.: 14/172,627

(22) Filed: Feb. 4, 2014

(65) Prior Publication Data

US 2014/0217950 A1    Aug. 7, 2014

(30) Foreign Application Priority Data

Feb. 5, 2013    (JP) .................................. 2013-020715

(51) Int. Cl.
| | |
|---|---|
| *H02P 1/30* | (2006.01) |
| *H02P 1/52* | (2006.01) |
| *H02P 3/00* | (2006.01) |
| *H02P 23/00* | (2006.01) |
| *G04C 10/00* | (2006.01) |
| *G04G 19/06* | (2006.01) |
| *H02M 1/00* | (2007.01) |

(52) U.S. Cl.
CPC ............ *H02P 23/0095* (2013.01); *G04C 10/00* (2013.01); *H02M 2001/0006* (2013.01); *H02M 2001/0035* (2013.01); *G04G 19/06* (2013.01)

(58) Field of Classification Search
CPC ....................................................... H02M 3/156
USPC ........................................................ 318/503
See application file for complete search history.

(56) References Cited

FOREIGN PATENT DOCUMENTS

JP    2000-298523 A    10/2000

*Primary Examiner* — Erick Glass

(74) *Attorney, Agent, or Firm* — Brinks Gilson & Lione

(57) ABSTRACT

There are provided a constant voltage circuit that outputs a stable constant voltage for an analog electronic clock, and an analog electronic clock featuring low current consumption and prolonged battery life. The constant voltage circuit has a first voltage holding circuit connected between the gate of an output transistor and an output terminal and a second voltage holding circuit connected between the gate of the output transistor and a ground terminal, and carries out control such that the second voltage holding circuit is enabled when the motor is operated.

4 Claims, 6 Drawing Sheets

CONSTANT VOLTAGE CIRCUIT AND ANALOG ELECTRONIC CLOCK

RELATED APPLICATIONS

This application claims priority under 35 U.S.C. §119 to Japanese Patent Application No. 2013-020715 filed on Feb. 5, 2013, the entire content of which is hereby incorporated by reference.

BACKGROUND OF THE INVENTION

1. Field of the Invention

The present invention relates to a constant voltage circuit, which is capable of providing a stable constant voltage, and an analog electronic clock provided with the constant voltage circuit.

2. Background Art

FIG. 2 is a block diagram of an analog electronic clock. The analog electronic clock is comprised of a semiconductor device 81, a crystal 80, a battery 83, and a motor 82. The semiconductor device 81 is comprised of an oscillation circuit 811, to which the crystal 80 is connected, a frequency division circuit 812, a constant voltage circuit 810, which outputs a constant voltage VREG for driving the oscillation circuit 811 and the frequency division circuit 812, and an output circuit 813 which drives the motor 82.

An analog electronic clock is required to minimize the frequency of replacing the battery thereof, so that the semiconductor device 81 is required to reduce current consumption. Methods that have been proposed for reducing the current consumption of the semiconductor device 81 include, for example, a method whereby to reduce the operating current of the constant voltage circuit 810 and a method whereby to intermittently operate the constant voltage circuit 810 (refer to, for example, Patent Document 1).

FIG. 6 is a block diagram of a conventional constant voltage circuit. The conventional constant voltage circuit includes a reference voltage circuit 22 that generates a reference voltage Vref, a differential amplifier circuit 23, an output transistor 10, a feedback circuit 21, a holding circuit 40 composed of a capacitor, and a switch circuit 50.

The conventional constant voltage circuit has the holding circuit 40, which holds the gate voltage of the output transistor 10, and reduces power consumption by intermittently operating the differential amplifier circuit 23 and the like. The operations of the differential amplifier circuit 23 and the feedback circuit 21 are interrupted by a signal Φ1 and the switch circuit 50 is turned off. At this time, the gate voltage of the output transistor 10 is held by the holding circuit 40 at a voltage before the switch circuit 50 was turned off. Unless a load current significantly varies, the constant voltage circuit is capable of outputting the constant voltage VREG.

[Patent Document 1] Japanese Patent Application Laid-Open No. 2000-298523

However, due to the poor transient response characteristics of the differential amplifier circuit 23, the foregoing conventional constant voltage circuit with the reduced current consumption is incapable of maintaining an output voltage in the case where a load current significantly varies. For example, when the motor of the analog electronic clock is driven and the battery voltage rapidly drops, the poor transient response characteristics of the differential amplifier circuit 23 leads to a reduced voltage between the gate and the source of the output transistor 10, inconveniently causing the constant voltage VREG to vary. If the constant voltage VREG drops below an oscillation stop voltage VDOS of the oscillation circuit 811, then the oscillation circuit 811 may lose its stability and stop oscillation.

SUMMARY OF THE INVENTION

The present invention has been made with a view toward solving the problems described above and provides a constant voltage circuit which consumes less current and which is capable of providing a stable constant voltage even if a battery voltage varies.

To solve the foregoing problems, a constant voltage circuit in accordance with the present invention includes: a first switch circuit connected between a differential amplifier circuit and a gate of an output transistor; a first holding circuit connected between the gate of the output transistor and an output terminal through a second switch circuit; and a second holding circuit connected between the gate of the output transistor and a power supply terminal through a third switch circuit, wherein the constant voltage circuit has a first operation mode in which the differential amplifier circuit and the first switch circuit are intermittently operated by a first control signal, and the second switch circuit is turned on and the third switch circuit is turned off by a second control signal, and a second operation mode in which the differential amplifier circuit and the first switch circuit are turned on by the first control signal, while the second switch circuit is turned off and the third switch circuit is turned on by the second control signal.

According to the present invention, a constant voltage circuit which consumes less current and performs a stable operation can be provided. This makes it possible to provide an analog electronic clock featuring a prolonged battery life.

DETAILED DESCRIPTION OF THE PREFERRED EMBODIMENTS

The following will describe embodiments of the present invention with reference to the accompanying drawings.

First Embodiment

Figure 2:
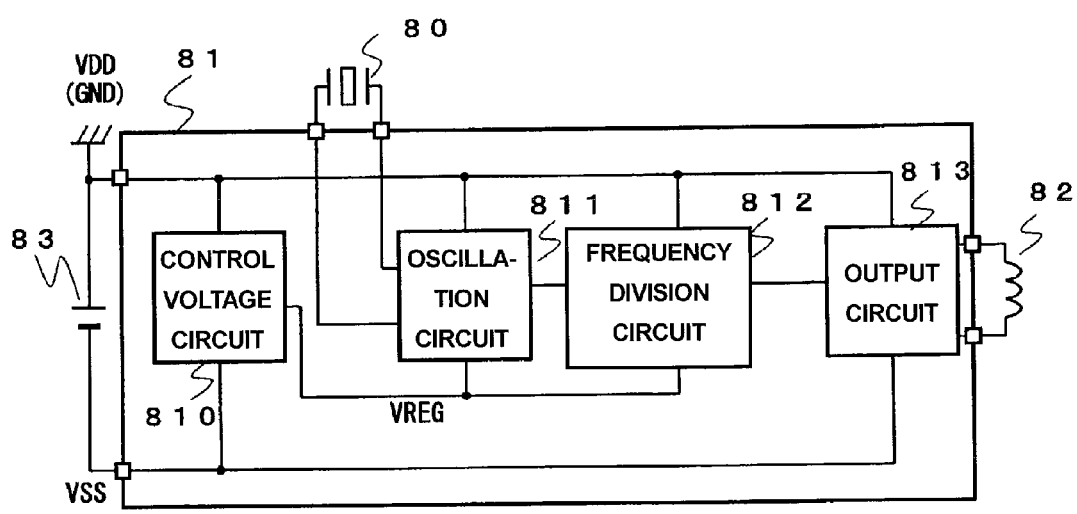
FIG. 2 is a block diagram of an analog electronic clock.

FIG. 2 is a block diagram of an analog electronic clock. The analog electronic clock is comprised of a semiconductor device 81, a crystal 80, the battery 83, and a motor 82. The semiconductor device 81 is comprised of an oscillation circuit 811 to which the crystal 80 is connected, a frequency division circuit 812, a constant voltage circuit 810 that outputs a constant voltage VREG for driving the oscillation circuit 811 and the frequency division circuit 812, and an output circuit 813 that drives the motor 82.

The analog electronic clock operates on the basis of a power supply Vdd. In the following description, therefore, all circuits will be based on the power supply Vdd.

The oscillation circuit 811 oscillates the crystal 80, which is external, at a stable frequency and outputs a clock signal of a fixed frequency. The frequency division circuit 812 divides the frequency of the clock signal of the oscillation circuit 811 and issues a signal of a required frequency. The output circuit 813 drives the motor 82 according to the signal from the frequency division circuit 812.

Figure 1:
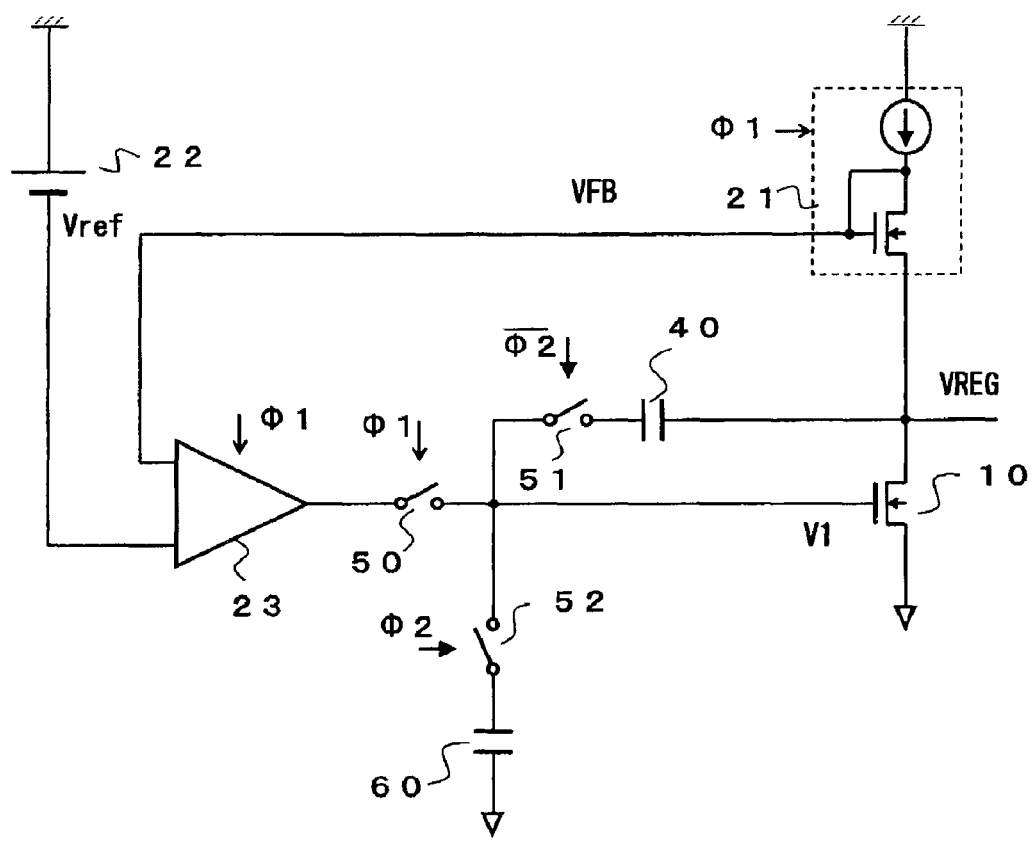
FIG. 1 is a circuit diagram illustrating a constant voltage circuit according to a first embodiment.

FIG. 1 is a circuit diagram of the constant voltage circuit according to a first embodiment.

The constant voltage circuit 810 has a reference voltage circuit 22, a differential amplifier circuit 23, a switch circuit 50, an output transistor 10, a feedback circuit 21, capacitors 40 and 60 constituting holding circuits, and switch circuits 51 and 52.

The reference voltage circuit 22 generates a reference voltage Vref. The feedback circuit 21 divides a voltage VREG of the output terminal and outputs a feedback voltage VFB. The differential amplifier circuit 23 outputs a voltage V1 to the gate of the output transistor 10 such that the reference voltage Vref and the feedback voltage VFB become equal. Further, the differential amplifier circuit 23 and the feedback circuit 21 are controlled to be turned on/off by a signal Φ1. The switch circuit 50 is controlled to be turned on/off by the signal Φ1 in synchronization with the differential amplifier circuit 23.

The holding circuit is comprised of the capacitor 40 connected between the gate of the output transistor 10 and the output terminal, the capacitor 60 connected between the gate of the output transistor 10 and a power supply terminal Vss, and the switch circuits 51 and 52. When the switch circuit 50 is turned off, the holding circuit retains a voltage V1 of the gate of the output transistor 10 before the switch circuit 50 was turned off.

The constant voltage circuit 810 achieves reduced current consumption by intermittently operating the differential amplifier circuit 23 and the feedback circuit 21 by the signal Φ1 to reduce the operating current of the differential amplifier circuit 23.

A description will now be given of the operation of the constant voltage circuit according to the present embodiment.

If the signal Φ1 and a signal Φ2 are both at a high level, then the constant voltage circuit 810 operates as a usual voltage regulator. The signal Φ1 is at the high level, so that the differential amplifier circuit 23 and the feedback circuit 21 operate, the switch circuit 50 is short-circuited, and the output terminal of the differential amplifier circuit 23 is connected to the gate of the output transistor 10. The signal Φ2 is also at the high level, so that the switch circuit 51 opens, the switch circuit 52 is short-circuited, and the capacitor 60 of the holding circuit is active.

If the signal Φ1 and the signal Φ2 are both at a low level, then the constant voltage circuit 810 stops operating as the voltage regulator and is set to a low current consumption state. Since the signal Φ1 is at the low level, the differential amplifier circuit 23 and the feedback circuit 21 stop operating, the switch circuit 50 opens, and the output terminal of the differential amplifier circuit 23 is cut off from the gate of the output transistor 10. The signal Φ2 is also at the low level, so that the switch circuit 51 is short-circuited, the switch circuit 52 opens, and the capacitor 40 of the holding circuit is active.

A description will now be given of an operation performed when the constant voltage circuit according to the present embodiment is applied to an analog electronic clock.

Figure 3:
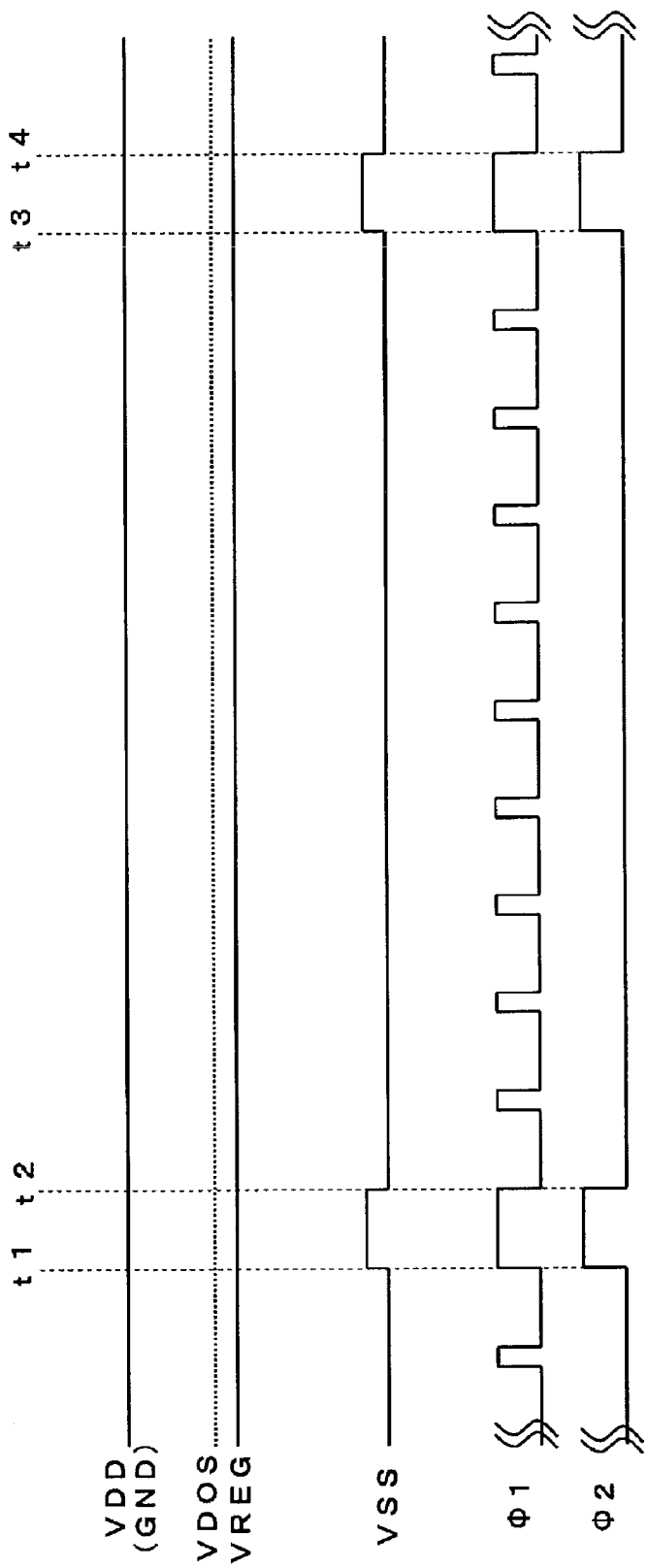
FIG. 3 is an illustration of an operation of the analog electronic clock.

FIG. 3 is a timing chart of the operation of the analog electronic clock. A voltage VDD denotes a ground voltage, a voltage VDOS denotes an oscillation stop voltage of the oscillation circuit 811, a voltage VREG is an output voltage of the constant voltage circuit 810, and the voltage VSS denotes the power supply voltage.

The operation period of the analog electronic clock can be roughly divided into a period represented by the period from t1 to t2 and the period from t3 to t4, during which motor pulses are output (a motor operation mode), and the remaining period (a normal operation mode). The two periods are repeated at regular intervals. The signal Φ1 is a signal that controls an intermittent operation. The signal Φ1, for example, goes to the high level for stabilizing the constant voltage VREG in the motor operation mode, and continuously repeats the high level and the low level to carry out the low current consumption operation in the normal operation mode. The signal Φ2 is a signal for switching the operation mode. The signal Φ2 is controlled, for example, to be at the high level in the motor operation mode and to be at the low level in the normal operation mode.

In the normal operation mode, the signal Φ1 repeatedly switches between the high and the low levels at appropriate interval and duty, while the signal Φ2 remains at the low level. Hence, the constant voltage circuit 810 performs the intermittent operation. Further, the capacitor 40 of the holding circuit becomes active, thus enabling the constant voltage circuit 810 to output the constant voltage VREG even after the differential amplifier circuit 23 and the feedback circuit 21 stop their operations.

In the motor operation mode, the signal Φ1 and the signal Φ2 are both at the high level, and the constant voltage circuit 810 operates as the usual voltage regulator, the capacitor 60 being active. In the motor operation mode, a battery voltage |VSS| drops by a voltage value determined by the product of the load current of the motor 82 and the internal resistance of the battery 83, and the source voltage of the output transistor 10 increases toward the VDD. At this time, the coupling operation of the capacitor 60 causes the gate voltage of the output transistor 10 to also increase toward the VDD, thus holding the voltage between the gate and the source of the output transistor 10 at a constant level. This enables the constant voltage circuit 810 to hold the constant voltage VREG at a constant level (the period of t1 to t2 in FIG. 3).

As described above, the constant voltage circuit 810 is capable of stably outputting the constant voltage VREG also in the motor operation mode, thus permitting a stable oscillation output of the oscillation circuit 811.

Figure 4:
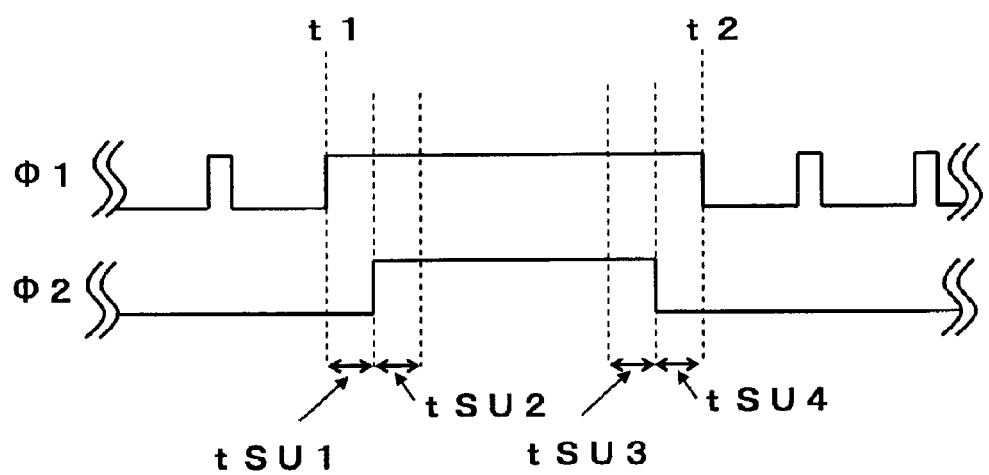
FIG. 4 is another illustration of the operation of the analog electronic clock.

FIG. 4 is a detailed timing chart illustrating the switching of the operation mode.

When switching between the capacitor 40 and the capacitor 60 of the holding circuits, the stable operation of the constant voltage circuit is ensured only if the differential amplifier circuit 23 and the feedback circuit 21 are in operation, so that it is necessary to secure setup times tSU1 and tSU4.

Further, the stable operation of the constant voltage circuit is ensured only if the constant voltage circuit has securely switched the capacitor from the capacitor 40 to the capacitor 60 before the motor operation mode is started. It is necessary, therefore, to secure setup time tSU2. Similarly, it is necessary to secure setup time tSU3 when the signal Φ2 is switched from the high level to the low level.

Second Embodiment

Figure 5:
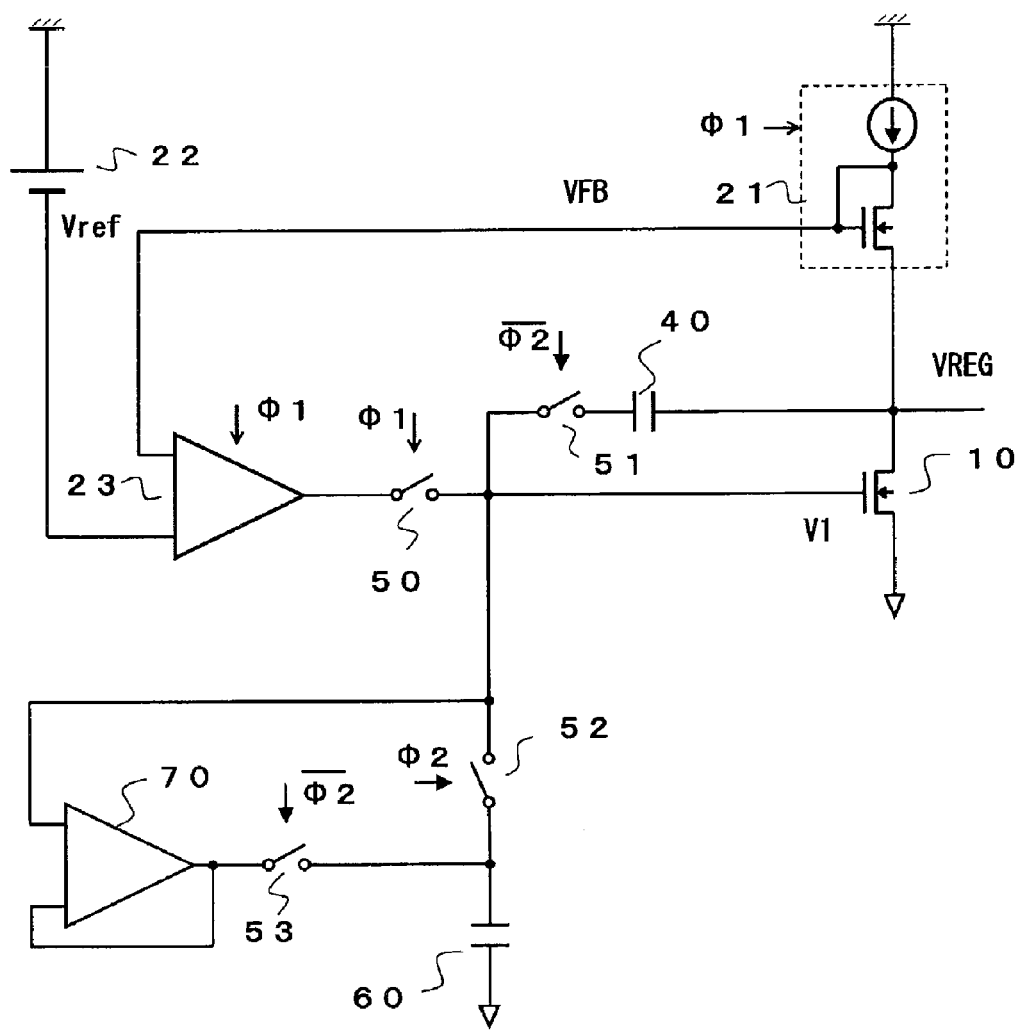
FIG. 5 is a circuit diagram of a constant voltage circuit according to a second embodiment.
Figure 6:
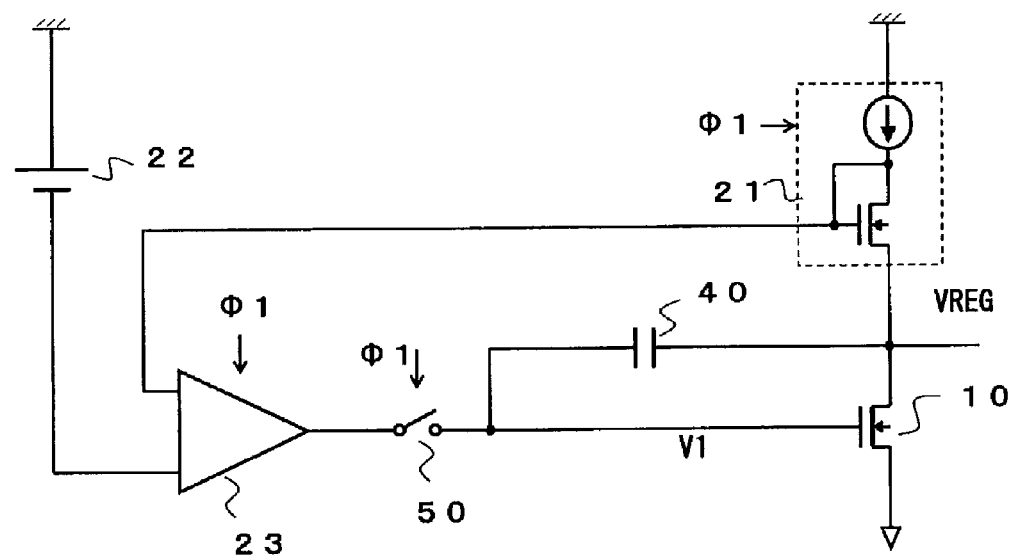
FIG. 6 is a circuit diagram illustrating a conventional constant voltage circuit.

FIG. 5 is a circuit diagram of a constant voltage circuit according to a second embodiment. Like constituent elements as those in the constant voltage circuit according to the first embodiment will be assigned like reference numerals, and the detailed descriptions thereof will be omitted.

The constant voltage circuit according to the second embodiment includes a precharge circuit for precharging a capacitor 60. The precharge circuit includes a voltage follower circuit 70 and a switch circuit 53. The voltage follower circuit 70 receives a gate voltage V1 of an output transistor 10 and outputs the gate voltage V1 to the capacitor 60. The switch circuit 53 is short-circuited when a signal Φ2 is at a low level and opens when the signal Φ2 goes to a high level.

The constant voltage circuit according to the second embodiment short-circuits the switch circuit 53 to precharge the capacitor 60 to the gate voltage V1 of the output transistor 10 by the voltage follower circuit 70 in a normal operation mode. Thus, the gate voltage V1 of the output transistor 10 does not change when the signal Φ2 switches from the low level to the high level, enabling the constant voltage circuit to stably output a constant voltage VREG.

As described above, the constant voltage circuit according to the second embodiment is capable of outputting the constant voltage VREG that is further stable.

The voltage follower circuit 70 may be configured to perform an intermittent operation by an additional signal Φ3 to reduce current consumption.

Further, in the constant voltage circuit, a capacitor 40 may be also provided with a precharge circuit.

What is claimed is:

1. A constant voltage circuit, the operation of which consumes less current by performing an intermittent operation at a predetermined interval and which outputs a constant voltage to an output terminal, the constant voltage circuit comprising:
    an output transistor connected to the output terminal;
    a differential amplifier circuit which controls a gate of the output transistor such that a voltage of the output terminal becomes a constant voltage;
    a first switch circuit connected between the differential amplifier circuit and the gate of the output transistor;
    a first holding circuit connected between the gate of the output transistor and the output terminal through a second switch circuit; and
    a second holding circuit connected between the gate of the output transistor and a power supply terminal through a third switch circuit,
    wherein the constant voltage circuit has:
    a first operation mode in which the differential amplifier circuit and the first switch circuit are intermittently operated by a first control signal, and the second switch circuit is turned on and the third switch circuit is turned off by a second control signal; and
    a second operation mode in which the differential amplifier circuit and the first switch circuit are turned on by the first control signal, and the second switch circuit is turned off and the third switch circuit is turned on by the second control signal.

2. The constant voltage circuit according to claim 1, comprising:
    a precharge circuit which sets the second holding circuit to a voltage of the gate of the output transistor while the third switch circuit is off.

3. The constant voltage circuit according to claim 2,
    wherein the precharge circuit is constituted of a voltage follower circuit which has an input terminal thereof connected to the gate of the output transistor and an output terminal thereof connected to the second holding circuit through a fourth switch circuit.

4. An analog electronic clock comprising:
    a semiconductor device having an oscillation circuit to which power is supplied from the constant voltage circuit according to claim 1; and
    a motor driven by an output signal of the semiconductor device.

* * * * *